(No Model.)
S. WILLIAMS.
MACHINE FOR DRIVING HORSES.
No. 500,311. Patented June 27, 1893.
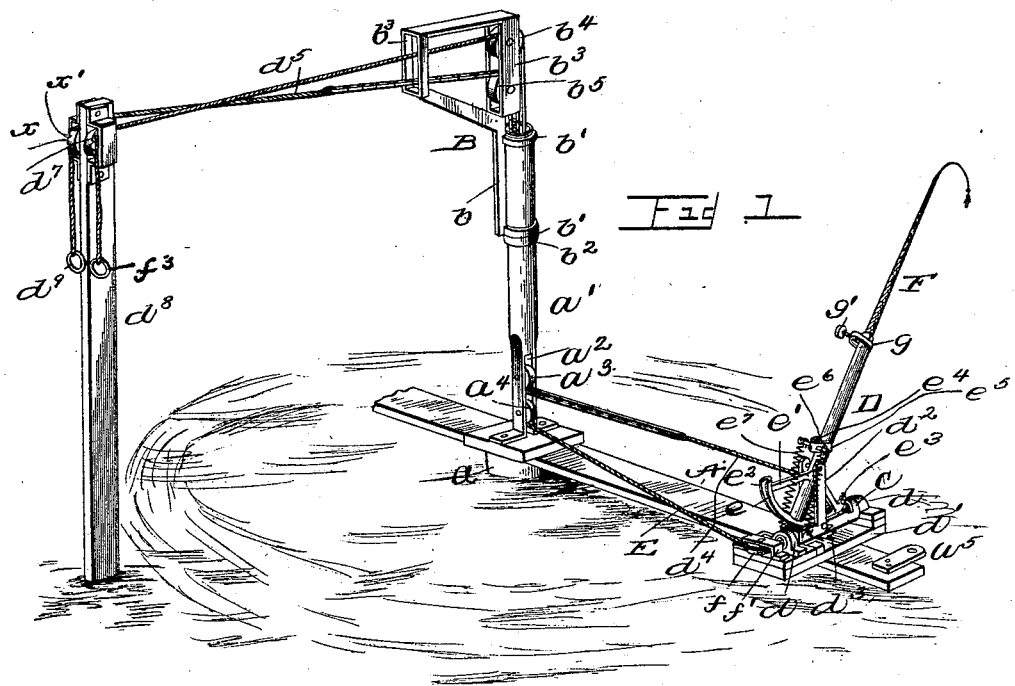
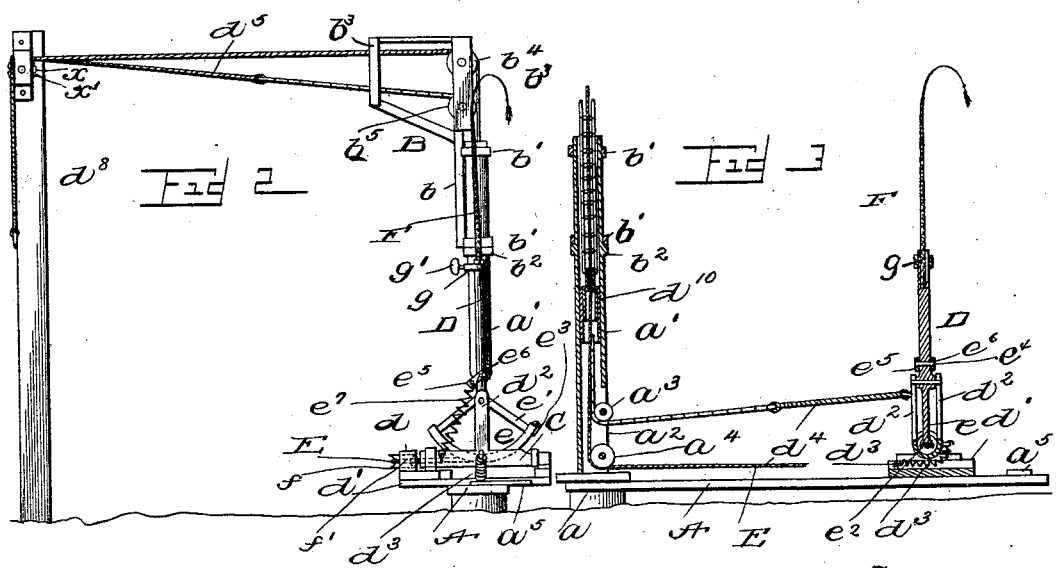
Witnesses
Inventor
Sam. Williams,
By John Waddeston
Attorney

UNITED STATES PATENT OFFICE.

SAMUEL WILLIAMS, OF BOWIE, TEXAS.

MACHINE FOR DRIVING HORSES.

SPECIFICATION forming part of Letters Patent No. 500,311, dated June 27, 1893.

Application filed July 27, 1892. Serial No. 441,372. (No model.)

*To all whom it may concern:*

Be it known that I, SAMUEL WILLIAMS, of Bowie, in the county of Montague and State of Texas, have invented certain new and useful Improvements in Machines for Driving Horses; and I do hereby declare the following to be a full, clear, and exact description of the invention, such as will enable others skilled in the art to which it appertains to make and use the same.

This invention relates to a new and improved horse-whipping or driving machine, and has for its object the production of simple and highly efficient means for whipping or driving horses connected to horse power machines, such as thrashers, fans, bark-mills, and the like.

The invention comprises a whip-carrying lever pivotally mounted on one end of the sweep-lever of a draft horse power, and means for moving said lever so that the whip will be caused to strike the draft horses.

The invention further comprises a lever pivotally secured to a rock-shaft or frame mounted on one end of a sweep lever, springs attached to said lever at one side, a spring connected to said rock-shaft or frame, a whip being carried by said lever, a cord or strap connected to said lever for operating the same in opposite directions, and a strap or chain for tilting said rock-shaft or frame or holding it so that said lever and whip will be in any desired plane for effecting the whipping of one, two or more horses.

The invention further comprises the detail construction, combination and arrangement of parts, substantially as hereinafter fully set forth and particularly pointed out in the claims.

In the accompanying drawings:—Figure 1 is a view in perspective of my improved horse-whipping mechanism, shown in connection with the sweep-lever of a power machine. Fig. 2 is an end view thereof. Fig. 3 is a vertical sectional view.

Referring to the drawings, A designates a sweep-lever of a horse-power machine (not shown) pivotally secured at its center, as at $a$, so that it is free to revolve in a circle; and $a'$ is a hollow post rigidly connected to said sweep-lever at the center thereof, the lower end of said post having an opening $a^2$ in one side. Within this lower end are two pulleys $a^3, a^4$. A draft-attaching loop $a^5$ is connected to one end of sweep-lever A to permit of the attachment thereto of the draft horse or horses.

B is a frame provided with a lower arm $b$ having two rings $b'$ projecting therefrom and loosely encircling post $a'$, the lower ring resting upon a shoulder $b^2$ of said post. This frame has two upper vertical looped portions $b^3$ in the inner one of which are mounted two pulleys $b^4, b^5$. The post $a'$ is free to revolve with the sweep lever without moving frame B.

C is a rock-shaft or frame having its ends supported by journal boxes $d$ attached to a board or support $d'$ rigidly secured on one end of sweep-lever A. This shaft or frame is open along its top, and from it project two corresponding arms $d^2$. To the outer side of this shaft or frame is connected one end of a coil spring $d^3$, the other end thereof being attached to a board or support $d'$. To this shaft or frame is attached one end of a chain or strap $d^4$, which is passed beneath pulley $a^2$ of post $a'$, and up through said post and then over the pulley $b^5$, and to it is connected a cord $d^5$ which is passed over one of two pulleys $d^7$ supported by a post $d^8$, or some other suitable point, such as the side of the building. A ring $d^9$ is attached to the outer end of this cord $d^5$ so that the operator can readily operate the latter. These pulleys are of peculiar formation. The projecting sides or flanges $x$ have grooves or recesses $x'$ formed therein, so that the cord $d^5$ can be firmly held at any point by simply drawing it into any one of such grooves or recesses. A swivel $d^{10}$ within post $a'$ forms part of chain $d^4$ to permit of the turning of sweep-lever A without causing said chain to wind or run unevenly on the pulleys.

Between the arms $d^2$ of shaft or frame C is pivotally mounted a lever D, having a cylindrical portion, and a lower quadrant $e$, which latter is supported at its ends by inclined bars $e'$ fast with said cylindrical portion. In the outer periphery of this quadrant is a groove $e^2$ which terminates in a tubular portion $e^3$. To a cross-rod $e^4$ of a plate $e^5$ pivotally connected at $e^6$ to lever D are attached the upper ends of two coil springs $e^7$, which at their lower ends are connected to projections of rock-shaft or frame C. A cord or strap E is connected at one end to the tubular portion $e^3$ of quadrant $e$ and after being passed through groove $e^2$ is passed against a pulley $f$ held by a plate $f'$ of board or support $d'$ and is then passed beneath pulley $a^4$, up through post $a'$, over pulley $b^4$, and thence over the second pulley $d^7$, the end of said cord or strap having a loop or ring $f^3$ connected thereto. By pulling on this cord or strap E the lever D is made to move on its pivot. The outer end of the tubular portion of lever D is split and is provided with a yoke $g$ in which works a set-screw $g'$. A whip F is placed in this split end and is firmly held by the adjustment of the set-screw, which will bind the split end against the whip. Thus it will be seen that by pulling on the cord or strap E the whip carried by the pivoted lever is made to strike one of the draft horses; and by moving the rock-shaft or frame by pulling on its cord $d^5$ and again operating the whip-lever, another one of the draft horses will be struck by the whip. In this way I am enabled by a simple operation of two cords or straps to effect the whipping or striking of all the draft-horses attached to a horse power machine. The attachment is secured to that end of the sweep-lever to which the horses are attached, and the sweep lever is free to revolve without interference of or with the whipping mechanism, the swivels in the cords or chains preventing the latter from winding by reason of the revolution of the sweep-lever.

I claim as my invention—

1. The herein-described improved horse-whipping machine, comprising the lever carrying a whip at its outer end and having a quadrant at its inner end, the springs attached to said lever, the rock-shaft or frame supporting said lever, and the cord or strap fitted against said quadrant and connected to one end thereof, substantially as set forth.

2. The herein-described improved horse-whipping machine, comprising the rock-shaft or frame having corresponding arms, the springs connected to said shaft or frame, the lever pivotally mounted between said arms, and having springs connected thereto, the whip in the outer end of said lever, and the cord or strap attached to said lever together with means for adjusting said rock-shaft or frame, substantially as set forth.

3. The herein-described improved horse-whipping machine for a draft horse power, comprising the combination with the sweep lever, of the post mounted on said sweep lever and having pulleys at its upper and lower ends, the rock shaft or frame at one end of said sweep-lever, the lever pivotally mounted on said shaft or frame and carrying a whip, the strap or chain connected to said shaft or frame, and the cord or strap attached to the inner end of said lever, said strap or chain and cord or strap being in engagement with said pulleys, substantially as set forth.

4. The herein-described improved horse-whipping machine, comprising the combination, with the pivoted sweep-lever of a draft-horse power, of the post secured to said sweep lever and having pulleys in its lower end, the frame loosely secured to said post and having pulleys, the rock shaft or frame pivotally mounted on one end of said sweep-lever and having corresponding projecting arms, the lever pivotally mounted between said arms and having an outer split end and a quadrant at its inner end, the springs secured to said lever, the spring connected to said shaft or frame, the cord or strap fitted in a groove of said quadrant and attached to the end thereof, and the strap or chain connected to said shaft or frame, said cord or strap and strap or chain being in engagement with said pulleys, substantially as set forth.

In testimony whereof I have signed this specification in the presence of two subscribing witnesses.

SAMUEL WILLIAMS.

Witnesses:
G. F. THOMAS,
L. A. McDONALD.